United States Patent
Koizume et al.

(10) Patent No.: US 7,493,079 B2
(45) Date of Patent: Feb. 17, 2009

(54) MOBILE TERMINAL, METHOD FOR RECORDING/REPRODUCING BROADCAST IN MOBILE TERMINAL, AND BROADCAST RECORDING/REPRODUCTION PROGRAM

(75) Inventors: Michiaki Koizume, Daito (JP); Miwa Koshijima, Osaka (JP); Yoshiaki Suzuki, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 64 days.

(21) Appl. No.: 10/598,677

(22) PCT Filed: Mar. 7, 2005

(86) PCT No.: PCT/JP2005/003878

§ 371 (c)(1),
(2), (4) Date: Sep. 7, 2006

(87) PCT Pub. No.: WO2005/086477

PCT Pub. Date: Sep. 15, 2005

(65) Prior Publication Data

US 2007/0183744 A1    Aug. 9, 2007

(30) Foreign Application Priority Data

Mar. 8, 2004    (JP) ............................... 2004-064724

(51) Int. Cl.
*H04H 40/00* (2008.01)
(52) U.S. Cl. ............ 455/3.06; 348/14.06; 381/74; 386/83
(58) Field of Classification Search .............. 455/3.06
See application file for complete search history.

(56) References Cited

U.S. PATENT DOCUMENTS 5,351,075 A * 9/1994 Herz et al. .................. 725/13

(Continued)

FOREIGN PATENT DOCUMENTS

CN    1359231 A    7/2002

(Continued)

OTHER PUBLICATIONS

International Search Report of PCT/JP2005/003878, date of mailing May 24, 2005.

(Continued)

*Primary Examiner*—Matthew D. Anderson
*Assistant Examiner*—Hai V Nguyen
(74) *Attorney, Agent, or Firm*—Westerman, Hattori, Daniels & Adrian, LLP.

(57) ABSTRACT

To provide a mobile terminal having a broadcast receiving function, wherein even when reception of an incoming call or start of a call interrupts playback of a broadcast being received, all remaining contents of the broadcast including an interrupted part can be played back after the call has ended. Upon receiving notification of call start from a broadcast control unit 112, a recording/playback unit 113 interrupts outputting a TV broadcast being received to a speaker 105 and a display 106, and records audio data and video data in units of frames of the broadcast in a storage unit 114. Upon receiving notification of call end from the broadcast control unit 112, the recording/playback unit 113 continues recording the data in the storage unit 114, reads the data recorded in the storage unit 114 from an interrupted part thereof, and outputs these data to the speaker 105 and the display 106.

21 Claims, 8 Drawing Sheets

U.S. PATENT DOCUMENTS

| | | | | |
|---|---|---|---|---|
| 5,610,970 | A * | 3/1997 | Fuller et al. | 455/417 |
| 5,841,979 | A * | 11/1998 | Schulhof et al. | 709/237 |
| 5,914,941 | A * | 6/1999 | Janky | 370/313 |
| 5,924,016 | A * | 7/1999 | Fuller et al. | 379/202.01 |
| 6,363,411 | B1 * | 3/2002 | Dugan et al. | 709/202 |
| 6,549,942 | B1 * | 4/2003 | Janky et al. | 709/219 |
| 6,711,474 | B1 * | 3/2004 | Treyz et al. | 701/1 |
| 6,775,264 | B1 * | 8/2004 | Kurganov | 370/352 |
| 6,779,030 | B1 * | 8/2004 | Dugan et al. | 709/223 |
| 6,807,257 | B1 * | 10/2004 | Kurganov | 379/88.22 |
| 6,951,030 | B2 * | 9/2005 | Hirai et al. | 725/33 |
| 6,967,599 | B2 | 11/2005 | Choi et al. | |
| 7,024,156 | B2 * | 4/2006 | Kawamata et al. | 455/3.02 |
| 7,076,202 | B1 * | 7/2006 | Billmaier | 455/3.04 |
| 7,167,639 | B2 | 1/2007 | Haddad et al. | |
| 7,209,964 | B2 * | 4/2007 | Dugan et al. | 709/223 |
| 7,298,960 | B1 * | 11/2007 | Taylor et al. | 386/46 |
| 7,319,810 | B2 * | 1/2008 | Wada et al. | 386/83 |
| 7,319,869 | B2 * | 1/2008 | Dietz et al. | 455/426.1 |
| 7,327,723 | B2 * | 2/2008 | Kurganov | 370/352 |
| 2001/0002224 | A1 | 5/2001 | Sasaki et al. | |
| 2001/0034220 | A1 * | 10/2001 | Berstis | 455/186.1 |
| 2001/0051037 | A1 * | 12/2001 | Safadi et al. | 386/83 |
| 2002/0010937 | A1 * | 1/2002 | Hirai et al. | 725/91 |
| 2002/0040475 | A1 * | 4/2002 | Yap et al. | 725/39 |
| 2002/0069218 | A1 * | 6/2002 | Sull et al. | 707/501.1 |
| 2002/0100047 | A1 * | 7/2002 | Matoba et al. | 725/46 |
| 2002/0150382 | A1 | 10/2002 | Sasaki et al. | |
| 2002/0151271 | A1 * | 10/2002 | Tatsuji et al. | 455/3.05 |
| 2002/0151327 | A1 * | 10/2002 | Levitt | 455/556 |
| 2002/0154887 | A1 * | 10/2002 | Lu | 386/35 |
| 2003/0043260 | A1 * | 3/2003 | Yap et al. | 348/14.06 |
| 2003/0070182 | A1 * | 4/2003 | Pierre et al. | 725/135 |
| 2003/0072556 | A1 | 4/2003 | Okujima et al. | |
| 2003/0078000 | A1 * | 4/2003 | Tatsumi et al. | 455/3.06 |
| 2003/0099456 | A1 * | 5/2003 | Ohmura et al. | 386/46 |
| 2003/0162495 | A1 * | 8/2003 | Yonemoto et al. | 455/7 |
| 2003/0176937 | A1 * | 9/2003 | Janky et al. | 700/94 |
| 2004/0107255 | A1 * | 6/2004 | Ludwig et al. | 709/204 |
| 2004/0126091 | A1 * | 7/2004 | Sieben et al. | 386/52 |
| 2004/0258054 | A1 * | 12/2004 | Kurganov | 370/352 |
| 2004/0258055 | A1 * | 12/2004 | Kurganov | 370/352 |
| 2004/0267940 | A1 * | 12/2004 | Dideriksen et al. | 709/228 |
| 2005/0007967 | A1 * | 1/2005 | Keskar et al. | 370/310 |
| 2005/0021713 | A1 * | 1/2005 | Dugan et al. | 709/223 |
| 2005/0042983 | A1 * | 2/2005 | Borgward | 455/3.06 |
| 2005/0141872 | A1 * | 6/2005 | Mori | 386/83 |
| 2005/0144637 | A1 * | 6/2005 | Shikata et al. | 725/35 |
| 2005/0144646 | A1 * | 6/2005 | Lecrom et al. | 725/100 |
| 2005/0165918 | A1 * | 7/2005 | Wantanabe et al. | 709/223 |
| 2005/0183120 | A1 * | 8/2005 | Jain et al. | 725/46 |
| 2006/0014490 | A1 * | 1/2006 | Kopra et al. | 455/3.05 |
| 2006/0064716 | A1 * | 3/2006 | Sull et al. | 725/37 |
| 2006/0083484 | A1 * | 4/2006 | Wada et al. | 386/83 |
| 2006/0093998 | A1 * | 5/2006 | Vertegaal | 434/236 |
| 2006/0215847 | A1 * | 9/2006 | Hollemans et al. | 381/74 |
| 2006/0215988 | A1 * | 9/2006 | Tol et al. | 386/83 |
| 2006/0271646 | A1 * | 11/2006 | Janky et al. | 709/219 |
| 2007/0143398 | A1 * | 6/2007 | Graham | 709/204 |
| 2007/0183744 | A1 * | 8/2007 | Koizumi et al. | 386/83 |
| 2007/0250863 | A1 * | 10/2007 | Ferguson | 725/46 |
| 2007/0263601 | A1 * | 11/2007 | Kurganov | 370/352 |
| 2008/0077959 | A1 * | 3/2008 | Kirimura et al. | 725/46 |
| 2008/0109094 | A1 * | 5/2008 | Nakamura et al. | 700/94 |
| 2008/0123623 | A2 * | 5/2008 | Kurganov | 370/352 |

FOREIGN PATENT DOCUMENTS

| | | | |
|---|---|---|---|
| EP | 1833249 | A1 * | 9/2007 |
| JP | 8-138318 | A1 | 5/1996 |
| JP | 10-322232 | A | 12/1998 |
| JP | 2000-312344 | A | 11/2000 |
| JP | 2001-119671 | A | 4/2001 |
| JP | 2001-268488 | A | 9/2001 |
| JP | 2002-335479 | A | 11/2002 |
| JP | 2002-374489 | A | 12/2002 |
| JP | 2003-18546 | A | 1/2003 |
| JP | 2003111004 | A | 4/2003 |
| JP | 2003-169274 | A | 6/2003 |
| JP | 2003-178567 | A | 6/2003 |
| JP | 2003-329459 | A | 11/2003 |

OTHER PUBLICATIONS

Japanese Office Action for Application No. 2004-064724 mailed May 1, 2007.

Chinese Office Action issued in Chinese Application 200580007148.7, dated Aug. 29, 2008.

* cited by examiner

MOBILE TERMINAL, METHOD FOR RECORDING/REPRODUCING BROADCAST IN MOBILE TERMINAL, AND BROADCAST RECORDING/REPRODUCTION PROGRAM

TECHNICAL FIELD

The present invention relates to a mobile terminal having a communication function and a broadcast receiving function.

BACKGROUND ART

Recently, mobile terminals have remarkably become multifunctional. For example, mobile phones having a broadcast receiving function have been appeared.

When a user of such mobile phones receives an incoming call while watching a TV broadcast currently being received, the user usually gives a higher priority to a phone function for a call and interrupts watching the TV broadcast.

However, even if the user restarts watching the TV broadcast after the call has ended, the user often cannot follow the story of the TV broadcast because the user has missed a part of the TV broadcast interrupted during the call.

As one example of an art that allows a user to listen to a broadcast that the user has missed during a call, a method for controlling audio output for a radio receiver is disclosed in Japanese Patent Application Publication No. H10-322232.

DISCLOSURE OF THE INVENTION

The Problems the Invention is Going to Solve

However, this art only allows the user to listen to a recorded part of the broadcast interrupted during the call. The user misses a part currently being broadcasted while listening to the recorded part.

In view of the above problem, the present invention aims to provide a mobile terminal that can enable a user to watch both a recorded part of a broadcast interrupted during a call and a part of the broadcast being broadcasted while watching the recorded part.

Means to Solve the Problems

In order to solve the above problem, the present invention is a mobile terminal having a broadcast program receiving function in addition to a communication function, including: a memory; a recording unit operable, when playback of a broadcast program being received is disabled by the communication function, to record the broadcast program in the memory as broadcast data, the communication function having priority over the playback; and a playback unit operable, when the disabled playback changes to be enabled, to play back the broadcast data.

EFFECT OF THE INVENTION

According to the above structure, when playback is disabled, a part of a broadcast program that a user has missed is recorded in the memory. When the disabled playback changes to be enabled, the recorded part of the broadcast program can be played back. As a result, the user can watch all the parts of the broadcast program and follow the story of the broadcast program.

Also, the playback is disabled either on receipt of an incoming call having priority over the playback, on commencement of a call, or on occurrence of another situation, and the disabled playback changes to be enabled when the priority over the playback is cancelled.

According to the above structure, a part of a broadcast program that the user has missed during a call is played back after the call has ended. Accordingly, the user can watch all the parts of the broadcast program.

Also, the playback unit includes a first playback subunit operable to receive a specification of a playback speed from a user and play back the recorded broadcast data at the specified playback speed.

According to the above structure, the recorded part of the broadcast program is played back at a desired speed. Accordingly, chasing playback can be performed to catch up with a realtime broadcast.

Also, the first playback subunit includes: a standard playback subunit operable to play back the recorded broadcast data at a standard playback speed equal to an original playback speed of the broadcast program; and a high-speed playback subunit operable to play back the broadcast data at a playback speed higher than the standard playback speed.

According to the above structure, the user can specify a playback speed of either of a standard playback speed and a playback speed higher than the standard playback speed.

Also, the first playback subunit further includes a special playback subunit operable to perform slow playback and reverse playback during the playback of the recorded broadcast data.

According to the above structure, the mobile phone can perform special playback such as slow playback.

Also, the high-speed playback subunit includes a calculation subunit operable to receive a remaining playback time period from the user, and calculate, based on a predetermined formula, a playback speed indicating a number of frames to be played back per second, and the high-speed playback subunit reads the broadcast data from the memory, and plays back the read broadcast data at the calculated playback speed.

According to the above structure, the mobile phone receives, from the user, a time period until the playback of a recorded broadcast program catches up with a real-time broadcast, calculates a playback speed so as to complete the chasing playback at the end of the time period, and plays back the recorded broadcast program at the calculated playback speed.

Also, when another incoming call is received during the playback or when another call starts, the playback unit interrupts the playback, the calculation subunit recalculates a playback speed based on the predetermined formula, and an output subunit outputs the recorded broadcast data from an interrupted part, to a monitor at the re-calculated playback speed.

According to the above structure, even when an incoming call is received again during the playback of the recorded broadcast program, a playback speed is re-calculated when the call ends. Accordingly, the user can watch all the parts of the broadcast program.

Also, the predetermined formula used by the calculation subunit is [Formula 1]

$$x_n = x_0 + \frac{1}{t_R} \sum_{i=1}^{n} (x_0(t_i + P_{i-1}) - x_{i-1} P_{i-1}),$$

where $x_n$ is a reading speed at which the output subunit reads the video data from the memory after an end of a number of n calls [frame/sec], $x_0$ is a number of frames to be played back per second at the standard playback speed, i.e. a reading speed at which the video data to be read from the memory [30 fps], $t_R$ is a specified remaining high-speed playback time period (a chasing playback time period) [sec], $t_i$ is a duration of an i-th call [sec], and $p_i$ is a high-speed playback time period after an end of the i-th call [sec].

According to the above structure, a playback speed can be accurately calculated.

Also, when broadcasting of the broadcast program being played back ends, the recording unit stops recording the broadcast program.

According to the above structure, a broadcast program being played back can be surely recorded without interruption. Accordingly, the user can watch all the parts of the broadcast program.

Also, the playback unit further includes a second playback subunit operable, when the specification of the playback speed is not received, to play back the recorded broadcast data at a default playback speed suitable for hearing audio.

According to the above structure, the user can watch chasing playback of the broadcast program at a sufficient playback speed without a playback speed specification.

Also, the second playback subunit plays back the recorded broadcast data at a playback speed within a range from 1.0 time to 2.0 times the standard playback speed.

According to the above structure, playback can be performed at a playback speed the user can clearly listen to audio.

Also, when the playback of the recorded broadcast data by the second playback subunit or the high-speed playback subunit catches up with the real-time broadcast, or when broadcasting of the broadcast program being played back ends during the playback of the recorded broadcast data by the standard playback subunit, the recording unit stops recording the broadcast program.

According to the above structure, the user can watch all the parts of the broadcast program currently being played back.

Also, the present invention is a method for recording and playing back a broadcast program in a mobile terminal having a broadcast program receiving function in addition to a communication function, the method including the steps of: recording, when playback of a broadcast program being received is disabled by the communication function, the broadcast program in the memory as broadcast data, the communication function having priority over the playback; and playing back, when the disabled playback changes to be enabled, the broadcast data.

With the above method, the user can watch all the parts of the broadcast program and follow the story of the broadcast program.

Also, the present invention is a program for recording and playing back a broadcast program applied to a mobile terminal having a broadcast program receiving function in addition to a communication function, wherein the program causes a computer to execute the steps of: recording, when playback of a broadcast program being received is disabled by the communication function, the broadcast program in the memory as broadcast data, the communication function having priority over the playback; and playing back, when the disabled playback changes to be enabled, the broadcast data.

By applying such program to a mobile terminal having a communication function and a receiving function, the user can watch all the parts of the broadcast program.

DESCRIPTION OF THE CHARACTERS

Figure 1:
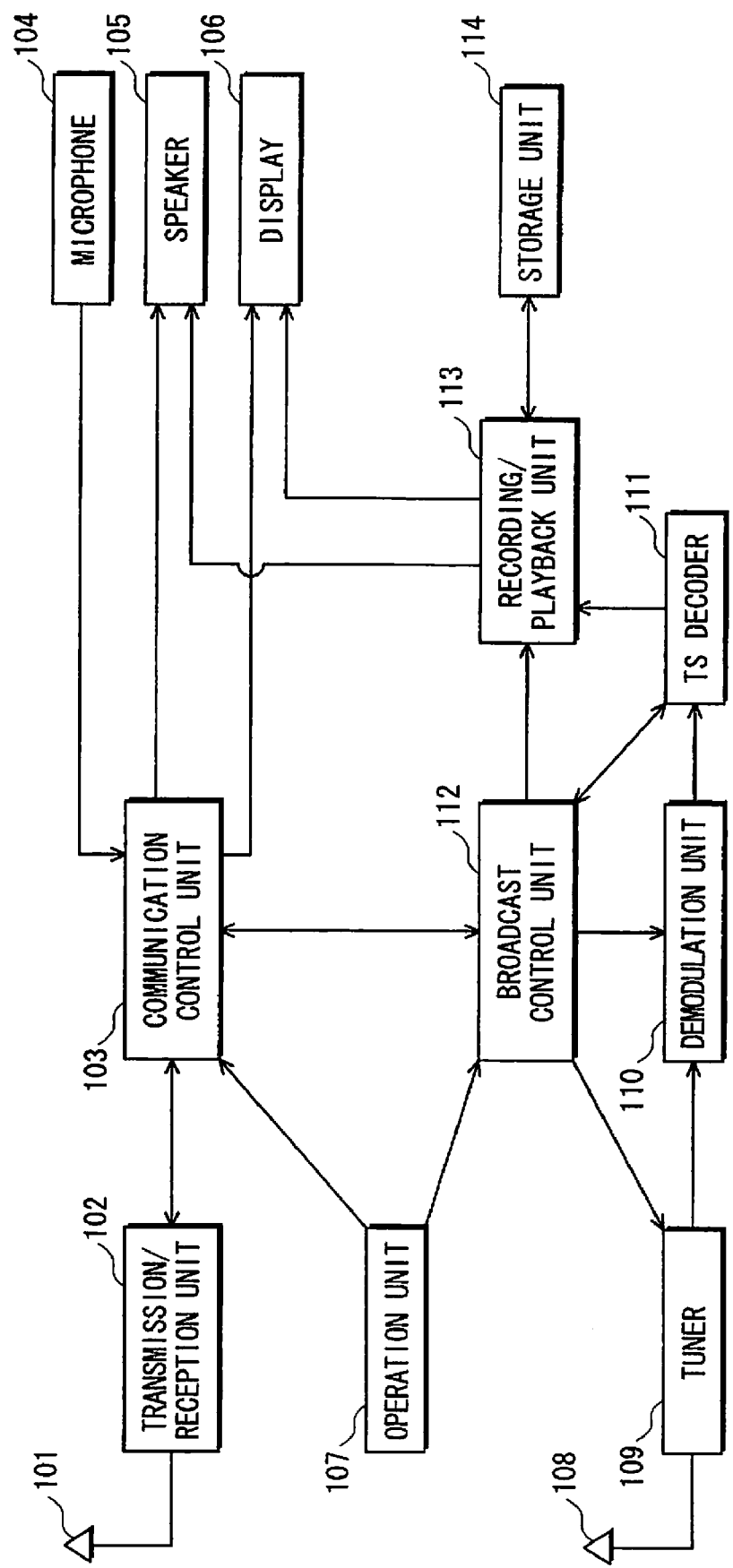
FIG. 1 shows a structure of an embodiment of a mobile terminal according to the present invention.

101: transmission/reception antenna
102: transmission/reception unit
103: communication control unit
104: microphone
105: speaker
106: display
107: operation unit
108: antenna
109: tuner
110: demodulation unit
111: TS decoder
112: broadcast control unit
113: recording/playback unit
114: storage unit

BEST MODE FOR CARRYING OUT THE INVENTION

The following will describe an embodiment of a mobile terminal according to the present invention with reference to the drawings.

EMBODIMENT

FIG. 1 shows a structure of an embodiment of a mobile phone, which is the mobile terminal according to the present invention.

The mobile phone includes an antenna 101, a transmission/reception unit 102, a communication control unit 103, a microphone 104, a speaker 105, a display 106, an operation unit 107, an antenna 108, a tuner 109, a demodulation unit 110, a TS decoder 111, a broadcast control unit 112, a recording/playback unit 113, and a storage unit 114.

The antenna 101 is an antenna for communication, and transmits and receives signals to and from a base station (not shown). The antenna 101 transmits a signal received from the base station to the transmission/reception unit 102, and transmits a signal transmitted from the transmission/reception unit 102 to the base station.

The transmission/reception unit 102 modulates the signal transmitted from the antenna 101, and transmits the modulated signal to the communication control unit 103. Also, the transmission/reception unit 102 demodulates a signal transmitted from the communication control unit 103, and transmits the demodulated signal to the antenna 101.

If the signal transmitted from the transmission/reception unit 102 is an audio signal, the communication control unit 103 D/A converts the audio signal, and outputs the D/A converted signal to the speaker 105. If the transmitted signal is a text signal or a video signal, the communication control unit 103 expands the signal into bit map data, and outputs the expanded bit map data to the display 106.

Also, upon receiving a notification of a phone number of a call party from the operation unit 107, the communication control unit 103 transmits a control signal for a call setup to the transmission/reception unit 102.

Upon receiving, from the transmission/reception unit 102, a control signal indicating that an incoming call has been received, the communication control unit 103 displays a phone number of a call originator on the display 106. In addition, the communication control unit 103 notifies the broadcast control unit 112 that the incoming call has been received.

Furthermore, upon receiving an audio signal from the microphone 104, the communication control unit 103 A/D converts the audio signal, and transmits the A/D converted audio signal to the transmission/reception unit 102.

Note that, in order to display the phone number of the call originator on the display 106 while the recording/playback unit 113 has been playing video of a TV broadcast program currently being received or video of the TV broadcast program recorded in the storage unit 114, the communication control unit 103 displays the phone number to overlap the video currently being displayed.

The microphone 104 collects voices of a user, and transmits an audio signal to the communication control unit 103.

The speaker 105 outputs, as audio, the audio signal transmitted from the communication control unit 103 or an audio signal of the broadcast program transmitted from the recording/playback unit 113.

The display 106 includes a liquid crystal display, etc., and outputs the bit map data expanded by the communication control unit 103, or the video of the broadcast program outputted by the recording/playback unit 113.

Figure 2:
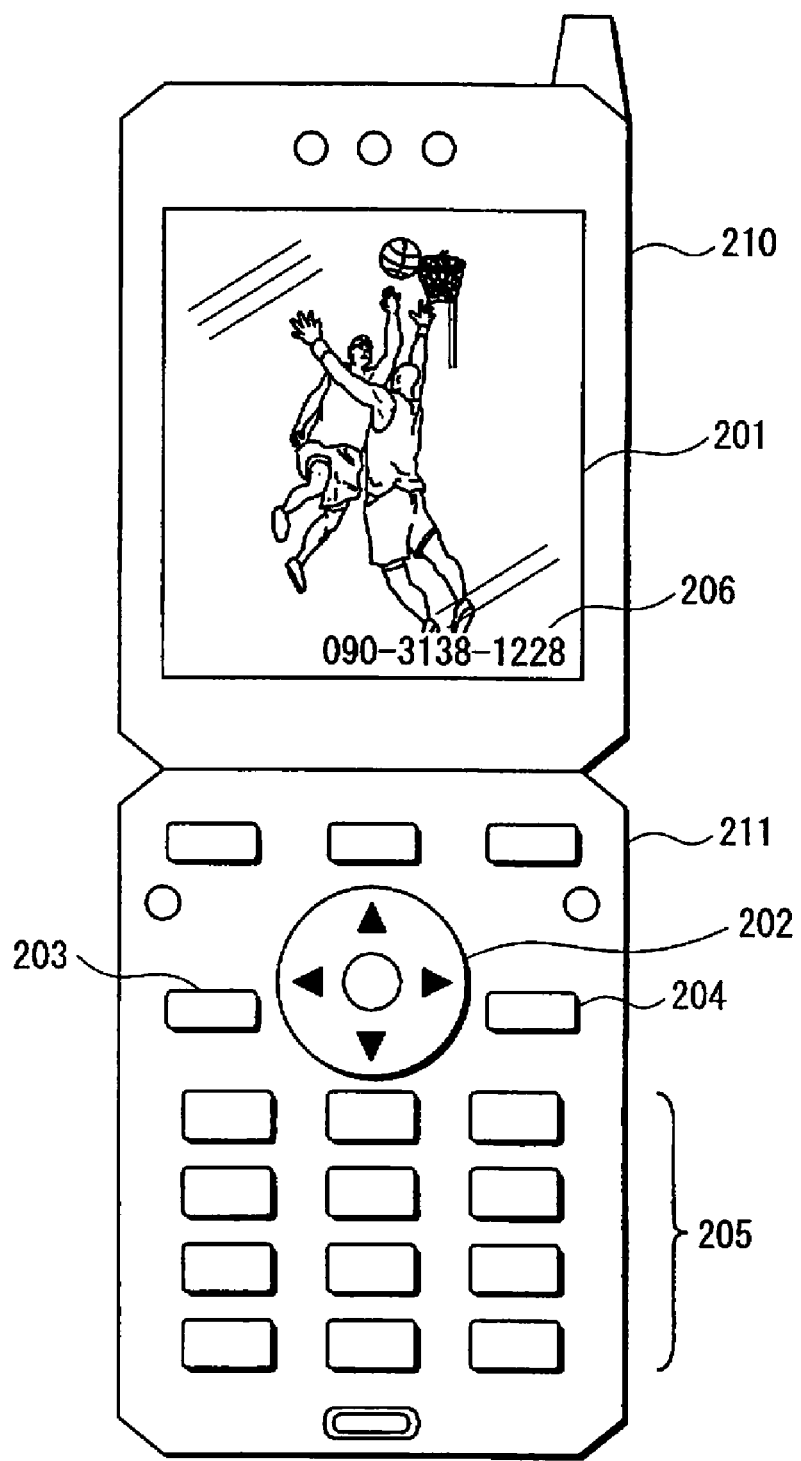
FIG. 2 shows a state of a screen on a display of the mobile terminal in the embodiment when an incoming calling is received while receiving a TV broadcast program.

FIG. 2 is a front view of the mobile phone, showing an example of a screen displayed on the display 106. In an upper case 210 of the mobile phone, a screen 201 is displayed on the display 106. In a lower case 211, keys are arranged, such as a selection determining key 202, a call key 203, a call end key 204, and a numeric key group 205, which are compositional elements of the operation unit 107.

Video of a TV broadcast program currently being received is being played back on the screen 201. If the mobile phone receives an incoming call right at this time, a phone number 206 of a call originator is displayed to overlap the video.

The operation unit 107 includes the above-mentioned keys such as the selection determining key 202 and the numeric key group 205, and receives an operation by the user, and transmits an operation signal to the communication control unit 103 or the broadcast control unit 112. Note that, when the operation by the user is a press of the call key 203 or the call end key 204, the operation unit 107 transmits an operation signal of the pressing to the communication control unit 103 or the broadcast control unit 112.

Also, in order to receive TV broadcasts, the operation unit 107 displays a menu on the display 106, receives an operation of the selection determining key 202, sequentially receives selections from a menu screen, and notifies the broadcast control unit 112 of the received selections. As a result, a desired TV broadcast program can be received.

Furthermore, the operation unit 107 receives an instruction of whether or not to specify a playback speed, specification of a remaining playback time period and specification of standard playback, instructions for performing and stopping special playback such as reverse playback, and notifies the broadcast control unit 112 of the specifications and instructions.

The antenna 108 receives a broadcast wave of a multiplexed transport stream of the TV broadcast, and outputs the received broadcast wave to the tuner 109. Note that the antenna 108 may function as the antenna 101.

The tuner 109 selects the broadcast wave inputted from the antenna 108 based on selection information notified from the broadcast control unit 112, and outputs the selected broadcast wave to the demodulation unit 110.

Under control of the broadcast control unit 112, the demodulation unit 110 demodulates the selected broadcast wave inputted from the tuner 109, and outputs the demodulated broadcast wave to the TS decoder 111.

Under control of the broadcast control unit 112, the TS decoder 111 separates the demodulated broadcast wave inputted from the demodulation unit 110 into a transport stream and control information in section format, outputs a transport stream of video data and a transport stream of audio data to the recording/playback unit 113, and outputs tables each having control information described therein such as a PAT, a PMT, an NIT, an SDT, and an EIT, to the broadcast control unit 112.

Upon receiving a user's instruction for selecting the TV broadcast inputted via the operation unit 107, the broadcast control unit 112 notifies the tuner 109 of the selection information, instructs the demodulation unit 110 to demodulate the broadcast wave, and instructs the TS decoder 111 to separate a transport stream of the broadcast program.

Upon receiving the tables each having the control information described therein inputted from the TS decoder 111, the broadcast control unit 112 stores the table in a storage region thereof, and instructs the recording/playback unit 113 to play back the transport stream of the video data and the transport stream of the audio data.

When the broadcast control unit 112 has received a notification from the communication control unit 103 that an incoming call has been received while receiving the TV broadcast program and then receives a notification of a pressing signal of the call key 203 from the operation unit 107, the broadcast control unit 112 interrupts outputting the audio and video data currently being played back by the recording/playback unit 113 to the speaker 105 and the display 106 respectively, and instructs the storage unit 114 to record the audio and video data. Also, upon receiving a notification of a pressing signal of the call end key 204 from the operation unit 107, the broadcast control unit 112 reads, from the storage unit 114, a part of the audio and video data interrupted from being outputted to the speaker 105 and the display 106 respectively due to a call, and instructs the recording/playback unit 113 to output the read part of the audio and video data to the speaker 105 and the display 106 respectively.

Upon receiving the notification of the instruction of whether or not to specify a playback speed from the operation unit 107, the broadcast control unit 112 notifies the recording/playback unit 113 of the received instruction. When the received instruction indicates the playback speed specification and then a specification of a remaining playback time period or a specification of standard playback is received, the broadcast control unit 112 notifies the recording/playback unit 113 of the received specification.

Upon receiving a specification of special playback such as reverse playback and slow playback from the operation unit 107 while the recording/playback unit 113 is playing back the audio and video data of the broadcast program recorded in the storage unit 114, the broadcast control unit 112 instructs the recording/playback unit 113 to perform the specified special playback.

Also, when the broadcast control unit 112 has received the notification of the playback at the standard playback speed from the operation unit 107 and then a playback end time of the broadcast program shown by the EIT comes, the broadcast control unit 112 instructs the recording/playback unit 113 to end recording the audio and video data currently being received in the storage unit 114.

Upon receiving the transport stream of the audio and the transport stream of the video data inputted from the TS decoder 111, the recording/playback unit 113 generates an elementary stream based on contents written in a transport stream packet, converts the video data into video in units of frames to be played back on the display 106, synchronizes the audio data with the video in units of frames, and then outputs the audio and the video to the speaker 105 and the display 106 respectively. Note that the recording/playback unit 113 displays the video at 30 frames per second on the display 106.

Upon receiving instructions for interrupting the output of the audio and video data to the speaker 105 and the display 106 respectively, and recording the data in the storage unit 114, from the broadcast control unit 112, the recording/playback unit 113 records the video data of the broadcast program being played back in units of frames in the storage unit 114 such that the audio data can be synchronized with the frames. The recording/playback unit 113 ends recording the data currently being received, when the recording/playback unit 113 receives the instruction for stopping recording the data because of the end of broadcasting of the broadcast program from the broadcast control unit 112, or reads all the frames of the video and audio data recorded in the storage unit 114 and the playback of the recorded video catches up with the broadcast program currently being received.

Upon receiving a specification of special playback such as slow playback from the broadcast control unit 112 during the playback of the broadcast program recorded in the storage unit 114, the recording/playback unit 113, in accordance with the specification, reads the video and audio data, and outputs the read audio and video data to the speaker 105 and the display 106 respectively for playback.

Note that, with regard to the special playback, even when high-speed playback is performed at a playback speed higher than the standard playback speed, the playback can be switched to playback at a playback speed 1.0 time the standard playback speed, which is lower than the high-speed playback. This enables the user to watch the video of the recorded program at 1.0 time playback speed even during high-speed playback.

The recording/playback unit 113 stores the following playback speed calculation formula (1).

[Formula 2]

$$x_n = x_0 + \frac{1}{t_R}\sum_{i=1}^{n}(x_0(t_i + P_{i-1}) - x_{i-1}P_{i-1}) \tag{1}$$

Here, $x_n$ is a reading speed at which video data is read from the storage unit 114 after the end of the number of n calls [frame/sec], $x_0$ is the number of frames to be played back per second at the standard playback speed, i.e. a reading speed at which the video data is read from the storage unit 114 [30 fps], $t_R$ is a specified remaining high-speed playback time period (a remaining chasing playback time period) [sec], $t_i$ is a duration of an i-th call [sec], and $p_i$ is a high-speed playback time period after the end of the i-th call [sec].

This playback speed calculation formula is derived as described below.

(1) The Case Where the Number of Calls is One

Figure 3A:
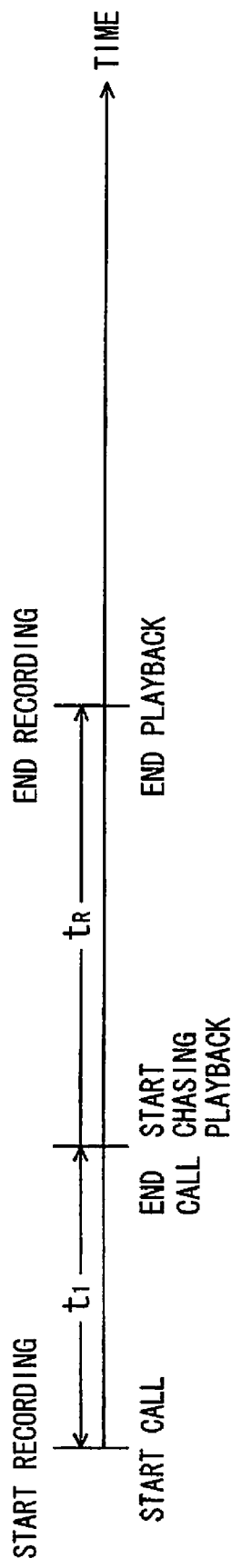
FIG. 3 describes calculation of a playback speed calculation formula used for calculating a playback speed in a recording/playback unit 113 in the embodiment.

As shown in FIG. 3A, simultaneously with start of a call, the recording/playback unit 113 starts recording video data in units of frames in the storage unit 114. After the duration of the i-th call $t_1$, the recording/playback unit 113 performs chasing playback for the specified time period $t_R$. When the playback catches up with a real-time broadcast, the recording/playback unit 113 ends recording the video data.

As a total of recording time periods is $(t_1+t_R)$ seconds, an information amount S of the video data in units of frames recorded in the storage unit 114 is given as the following.

[Formula 3]

$$S = x_0(t_1 + t_R) \tag{2}$$

The information volume S is played back for the specified time periods $t_R$.

[Formula 4]

$$S = x_1 t_R \tag{3}$$

Here, the playback speed $x_1$ is the number of frames to be read per second from the storage unit 114. Considering that the formula (2) is equal to the formula (3), the following is given.

[Formula 5]

$$x_0(t_1+t_R) = x_1 t_R$$

Therefore, the playback speed $x_1$ is given by the following formula.

[formula 6]

$$x_1 = \frac{x_0}{t_R}(t_1 + t_R) \tag{4}$$

(2) The Case Where the Number of Calls is Two

Figure 3B:
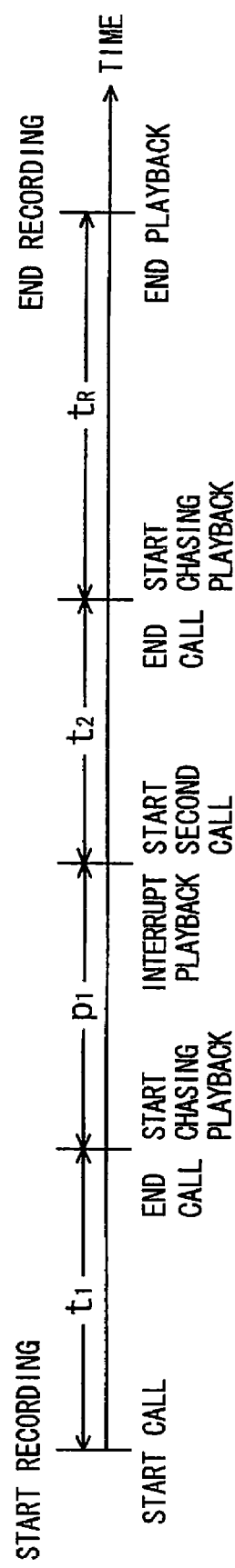

As shown in FIG. 3B, when a second call occurs during the chasing playback after the first call, a total of recording time periods is $(t_1+p_1+t_2+t_R)$ sec, therefore information amount S is given as the following.

[Formula 7]

$$s = x_0(t_1+p_1+t_2+t_R) - x_1 p_1 \tag{5}$$

With regard to a second term of a right side in the formula (5), it is considered that a part of the video data recorded in the storage unit 114 is played back after the end of the first call.

[Formula 8]

$$x_0(t_1+p_1+t_2+t_R) - x_1 p_1 = x_2 t_R$$

According to the above formula, a playback speed $x_2$ is given as the following.

[formula 9]
$$x_2 = \frac{x_0}{t_R}(t_1 + p_1 + t_2 + t_R) - \frac{x_1 p_1}{t_R} \quad (6)$$

(3) Generalization in the Case Where the Number of Calls is n

A total of recording time periods is given as the following.

[formula 10]
$$t_R + \sum_{i=1}^{n} t_i + \sum_{i=1}^{n-1} p_i$$

Here, when it is considered that a part of the video data has been played back until the interruption of the playback, the following is given.

[formula 11]
$$x_0 \left( t_R + \sum_{i=1}^{n} t_i + \sum_{i=1}^{n-1} p_i \right) - \sum_{i=1}^{n-1} x_i p_i = x_n t_R \quad (7)$$

Here, $p_0=0$, therefore the playback speed formula (1) is given.

In the above description, the second call occurs during the chasing playback. Also, when slow playback or reverse playback is performed instead of calls during the chasing playback, the above formulas are applicable in the same way. In this case, considering a sign, the reading speed $x_i$ is assigned as a value of minus in the reverse playback, whereas the reading speed $x_i$ is a value at less than 30 frames per second, for example a value at 15 frames per second, in the slow playback. This value may be defined as any value, off course.

Upon receiving an instruction, from the broadcast control unit 112, for outputting the part interrupted from being outputted due to the call, the recording/playback unit 113 reads a frame of the part of the video data recorded in the storage unit 114, and displays the read frame on the display 106. Simultaneously, the recording/playback unit 113 displays selection buttons for the user to select the instruction of whether or not to specify a playback speed to overlap the frame.

Figure 4:
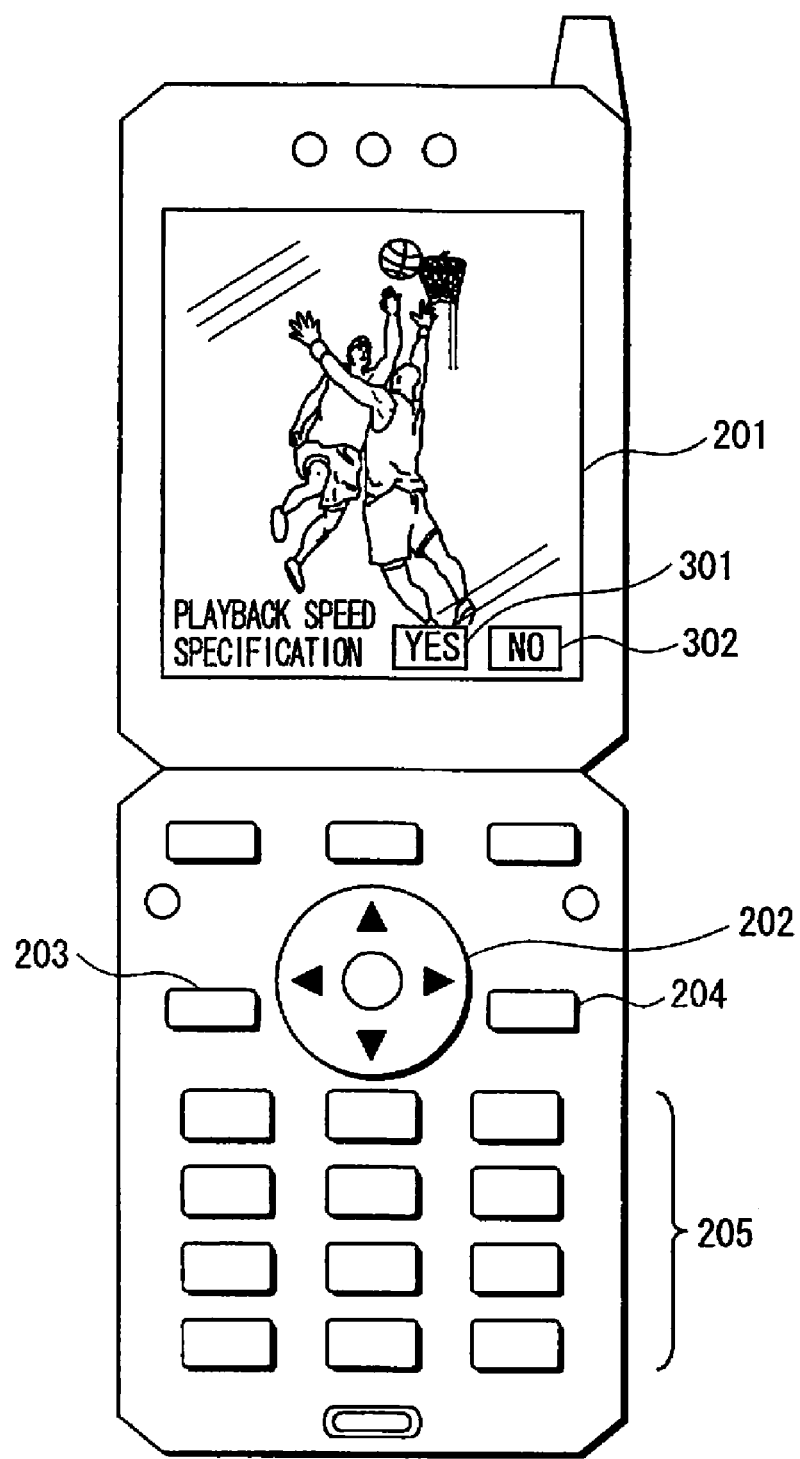
FIG. 4 shows a state of a screen on the display of the mobile terminal immediately after a call has ended while receiving a TV broadcast.

FIG. 4 shows a state of the screen 201 being immediately after the call has ended after the interruption of the playback of the video data shown in FIG. 2.

On the screen 201, an "YES" button 301 and a "NO" button 302 relating to the playback speed specification are displayed to overlap the video data of the broadcast program. The recording/playback unit 113 receives an operation signal of the selection determining key 202 pressed by the user via the broadcast control unit 112. When the "NO" button 302 is selected by the user, the recording/playback unit 113 reads a frame of the video data recorded in the storage unit 114, for example at a speed of 45 frames per second, i.e. 1.5 times speed of 30 frames at the standard playback speed, and displays the frames on the display 106, which are thinned out at a ratio of one per three frames.

Accordingly, the chasing playback is performed, for example at a speed of 1.5 times the standard playback speed so as to catch up with a real-time broadcast. Note that this default playback speed can be defined to any speed of exceeding 1.0 time to 2.0 times the standard playback speed. Also, an upper limit is defined to 2.0 times here since the audio outputted from the speaker 105 synchronized with this video data is recognizable at the speed of 2.0 times. However, a range of playback speed is not limited to the above range. Any playback speed can be set.

Figure 5:
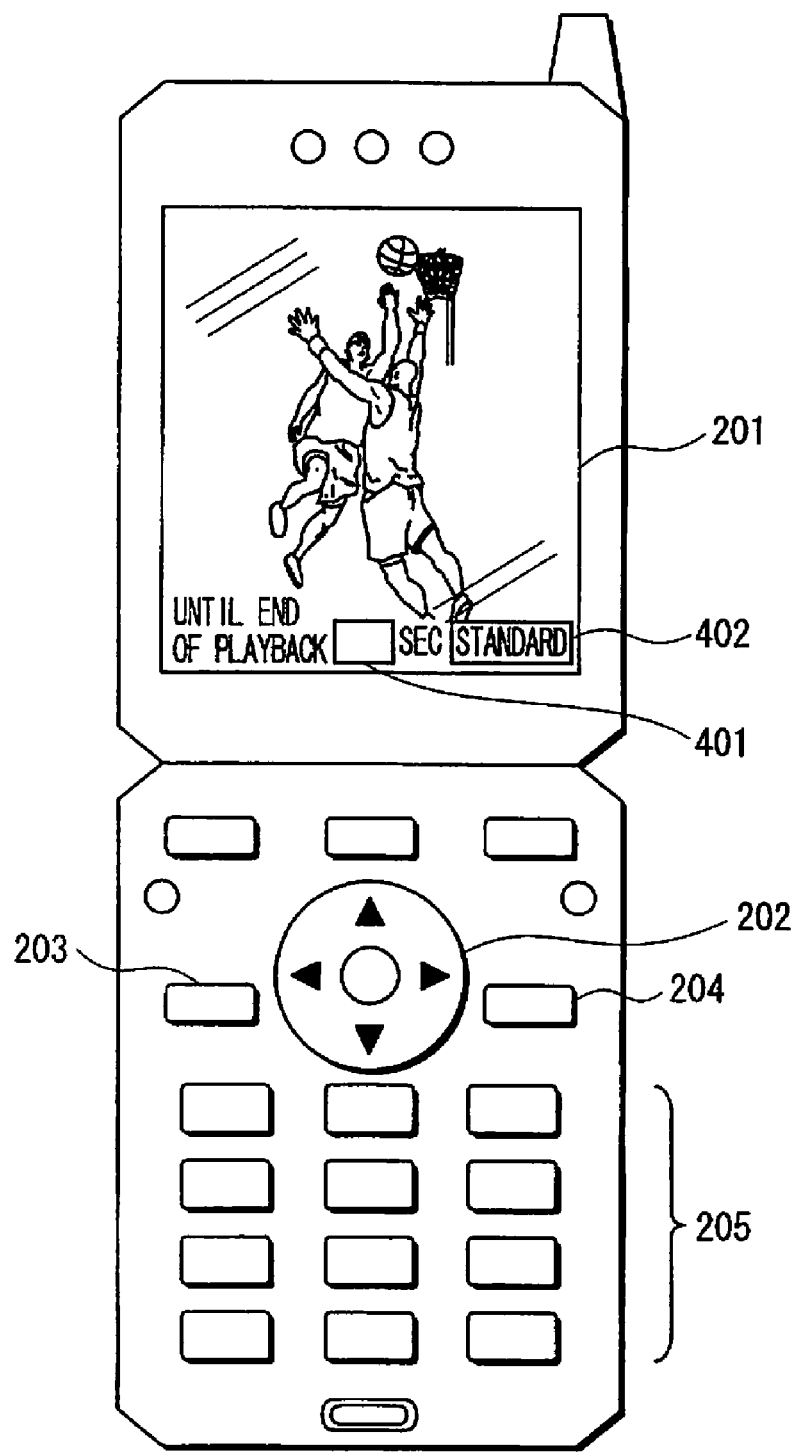
FIG. 5 shows a state of a screen on the display when speed specification "YES" is selected in the display state shown in FIG. 3.

On the other hand, When the "YES" button 301 is selected by the user, the recording/playback unit 113 displays a "BOX" 401 for receiving playback speed specification and a "STANDARD" button 402 to overlap the video data displayed on the screen 201, as shown in FIG. 5.

When receiving a signal of the "STANDARD" button 402 via the broadcast control unit 112, the recording/playback unit 113 reads video data of the broadcast program at a speed of 30 frames per second from the storage unit 114, and displays the read video data on the display 106. In addition, the recording/playback unit 113 reads the audio data from the storage unit 114, and outputs the read audio data to the speaker 105. The recording/playback unit 113 continues this processing until the end of the broadcasting of the TV broadcast program being currently received. Here, the recording/playback unit 113 also continues decrypting and elongating video and audio data of the broadcast program inputted from the TS decoder 111, and recording the video and audio data in the storage unit 114 as video data in units of frames.

Also, when a remaining playback time period is inputted to the "BOX" 401, the recording/playback unit 113 substitutes the specified time period $t_R$ for the playback speed calculation formula (1) to calculate a playback speed so as to perform chasing playback for the specified time period to catch up with the video data being continuously recorded in the storage unit 114. Values other than $x_n$ given in the playback speed calculation formula (1) are known values by measured using a timer and the like.

Here, when the playback speed $x_n$ given in the playback speed calculation formula (1) exceeds a predetermined value, for example a value of 90 frames per second, i.e. is three times the standard playback speed, video is unclearly played back. In this case, the recording/playback unit 113 may warn the user to re-input a remaining playback time period to the "BOX" 401.

Note that the predetermined value is a value at which the user cannot clearly listen to audio while watching the recorded broadcast program being played back, for example. As sensitivity depends on each user, the recording/playback unit 113 may set to so as allow each user to preset any predetermined value.

The storage unit 114 includes a semiconductor memory card, etc., stores video data of the broadcast program currently being received in units of frames, and records audio data so as to be synchronized with the frame. Note that the recording/playback unit 113 writes the video and audio data.

In the above embodiment, simultaneously with the start of the call, the recording/playback unit 113 starts recording the broadcast program currently being received in the storage unit 114, and interrupts outputting the broadcast program to the speaker 105 and the display 106. However, when the mobile phone receives an incoming call, the recording/playback unit 113 may start recording the broadcast program currently being received in the storage unit 114, and interrupts outputting the TV broadcast program to the speaker 105 and the display 106. In this case, information indicating that the incoming call has been received is displayed back on the display 106.

Figure 6:
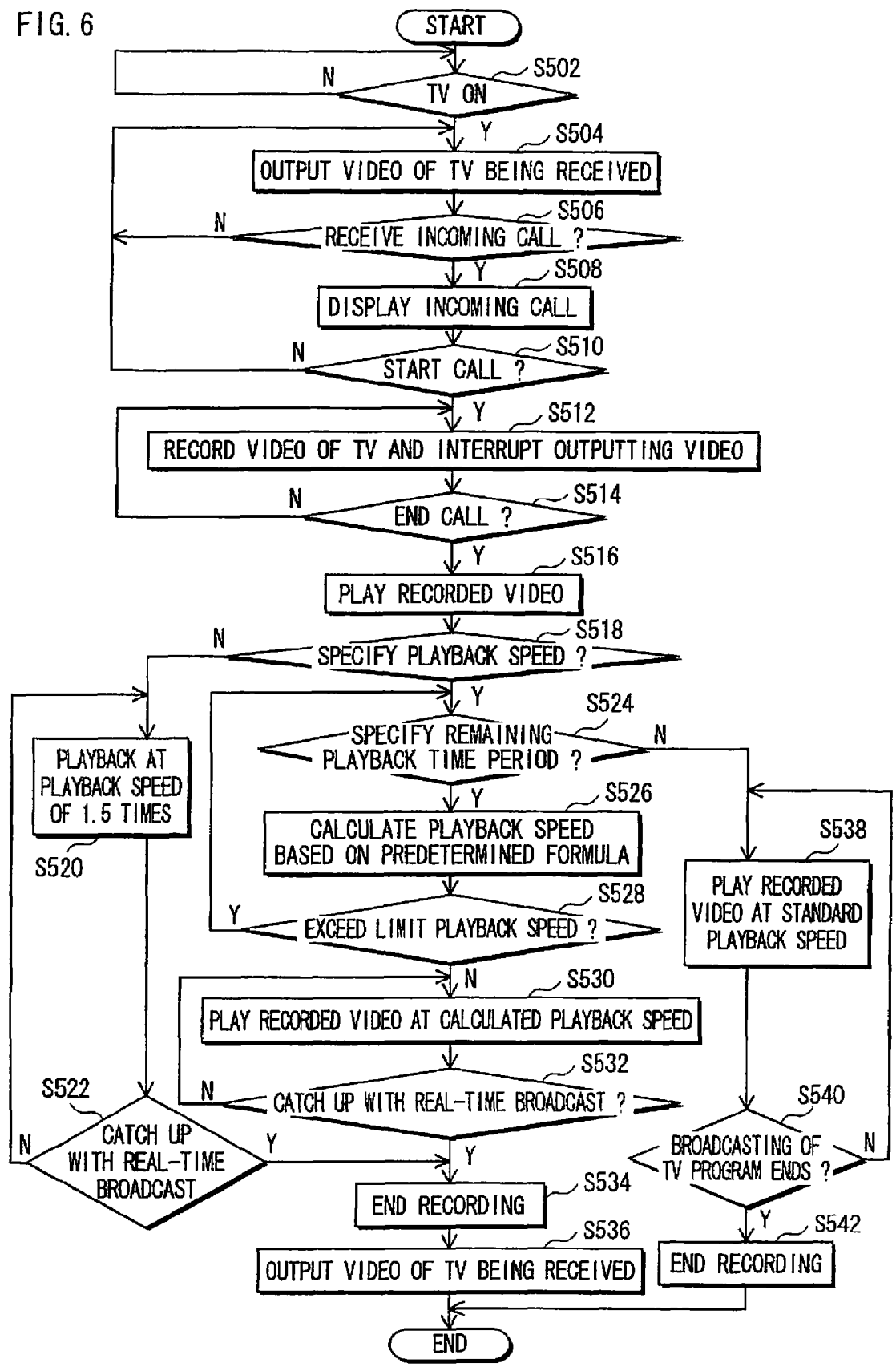
FIG. 6 is a flowchart describing operations in the embodiment.
Figure 7:
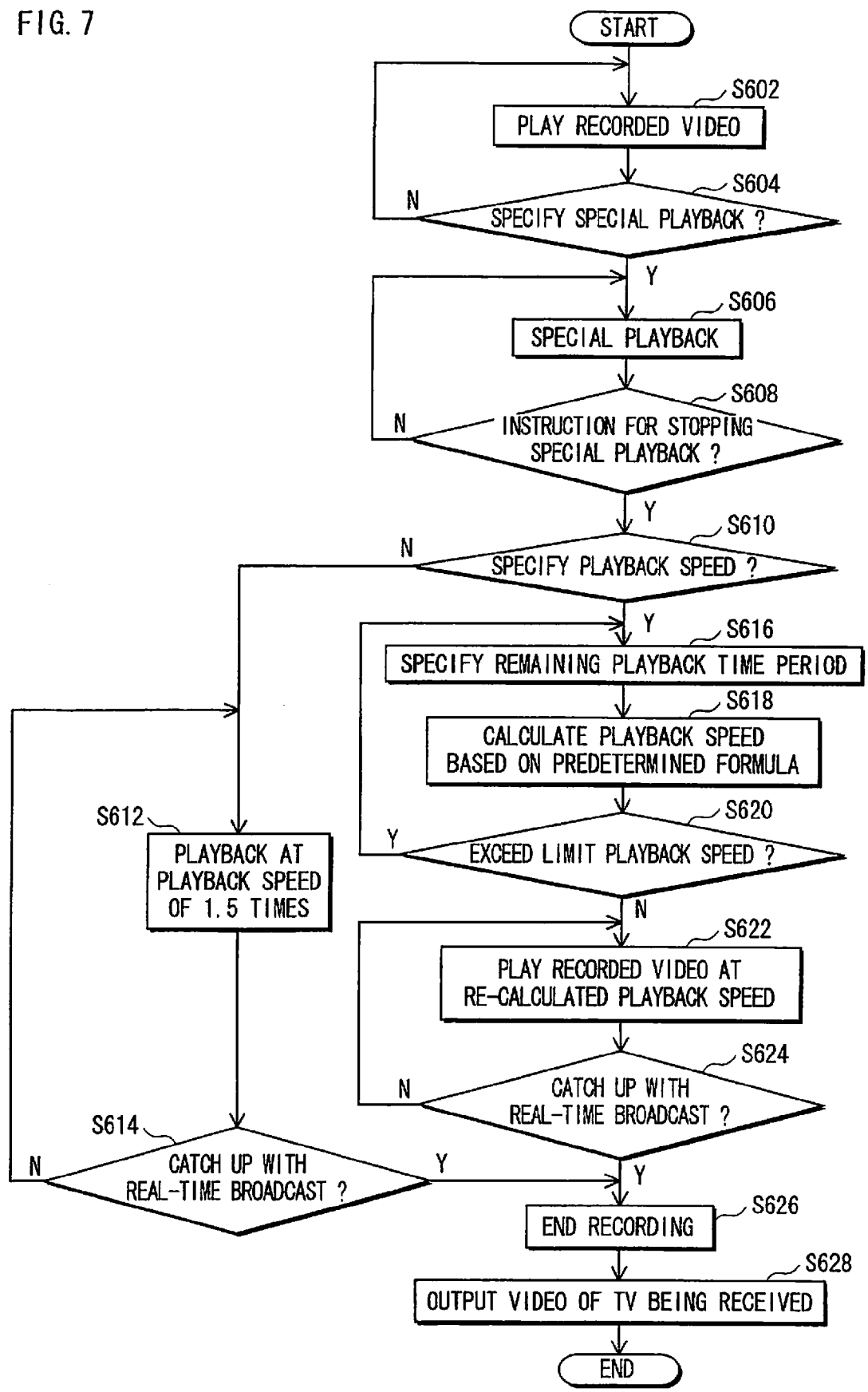
FIG. 7 is a flowchart describing special playback operations during the operations in STEP S520 or S530 in the flowchart shown in FIG. 6.
Figure 8:
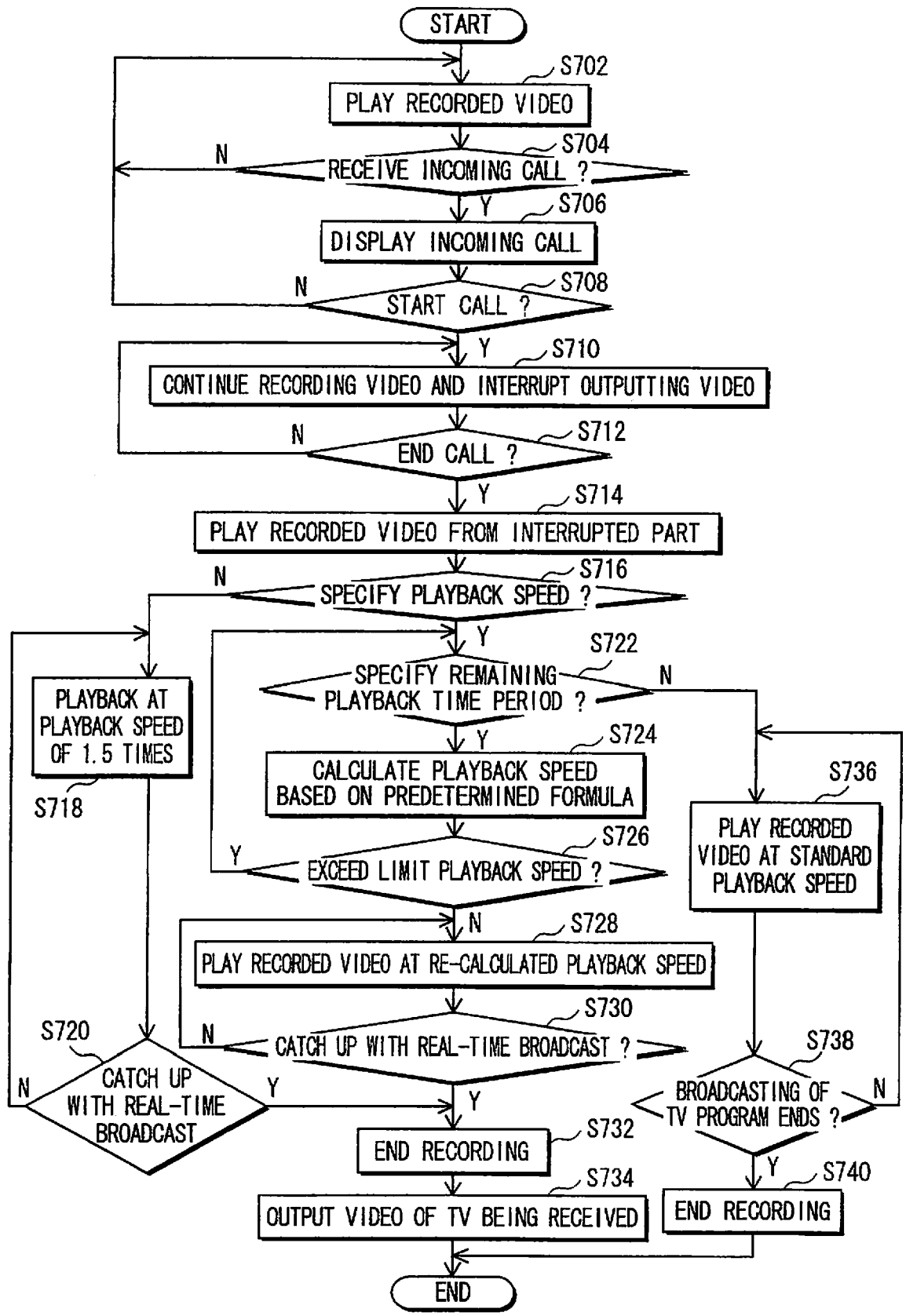
FIG. 8 is a flowchart describing operations when an incoming call is received again during the operations in STEP S520, S530, or S538 in the flowchart shown in FIG. 6.

The following will describe the operations in the embodiment with reference to the flowcharts shown in FIGS. 6 to 8.

FIG. 6 is the flowchart describing the operations in the case where the mobile phone receives an incoming call while receiving a TV broadcast program.

Upon receiving an instruction for watching the broadcast program from the operation unit 107 (STEP S502: Y), the broadcast control unit 112 instructs the tuner 109, the demodulation unit 110, the TS decoder 111, and the recording/playback unit 113 to receive the broadcast program.

The recording/playback unit 113 outputs video of the received broadcast program to the display 106, and synchronizes audio with the video, and outputs the synchronized audio to the speaker 105 (STEP S504).

When the mobile phone receives an incoming call while receiving the broadcast program (STEP S506: Y), the communication control unit 103 displays information indicating that the incoming call has been received to overlap the video being displayed, as shown in FIG. 2 (STEP S508).

When the user does not start a call (STEP S510: N), the processing returns to STEP S504. When the user starts the call (STEP S510: Y), the recording/playback unit 113 records video data of the broadcast program in units of frames so as to be synchronized with audio data in the storage unit 114, and interrupts outputting the audio and video of the broadcast program currently being received to the speaker 105 and the display 106 respectively (STEP S512).

Upon receiving a notification of call end from the broadcast control unit 112 (STEP S514: Y), the recording/playback unit 113 reads the audio and video data from the storage unit 114, and outputs the read audio and video data to the speaker 105 and the display 106 respectively to play back the recorded broadcast program (STEP S516).

Here, the recording/playback unit 113 displays the "YES" button 301 and the "NO" button 302 on the screen 201 to cause the user to select whether or not to specify a playback speed (STEP S518). When the playback speed is not specified (STEP S518: N), the recording/playback unit 113 plays back the recorded broadcast program at a default playback speed, which is a playback speed of 1.5 times the standard playback speed. That is, the recording/playback unit 113 reads the video at a speed of 45 frames per second, which is 1.5 times a speed of 30 frames per second from the storage unit 114, and displays 30 frames of the read video at the speed of 45 frames per second on the display 106. The recording/playback unit 113 outputs the audio data corresponding to the speed of 45 frames per second to the speaker 105 (STEP S520). The recording/playback unit 113 continues this processing until the playback of the recorded broadcast program catches up with the real-time broadcast (STEP S522). When the playback of the recorded broadcast program catches up, the processing proceeds to STEP S534.

When the playback speed is specified (STEP S518: Y), the storage unit 114 judges whether the specification is a specification of a remaining playback time period or a specification of standard playback (STEP S524).

When the remaining playback time period is specified (STEP S524: Y), the recording/playback unit 113 calculates a playback speed using the playback speed calculation formula (4) or the general playback speed formula (1) (STEP S526). The recording/playback unit 113 judges whether the calculated playback speed exceeds a limit playback speed, for example a speed of three times the standard playback speed (STEP S528). When the calculated playback speed exceeds (STEP S528: Y), the processing returns to STEP S524, and a remaining playback time period is re-specified by the user.

When the calculated playback speed does not exceed (STEP S528: N), the recording/playback unit 113 reads the frames of the video data from the storage unit 114 at the calculated playback speed, and displays the video at a speed of 30 frames per second on the display 106. And simultaneously, the recording/playback unit 113 synchronizes the audio with the video and outputs the audio to the speaker 105 (STEP S530).

The recording/playback unit 113 continues this processing until the playback of the recorded broadcast program catches up with the real-time broadcast (STEP S532). When the playback of the recorded program catches up (STEP S532: Y), the recording/playback unit 113 ends recording the broadcast program currently being received (STEP S534), outputs audio and video of the broadcast program currently being received to the speaker 105 and the display 106 respectively (STEP S536), and the processing ends.

When the standard playback is specified (STEP S524: N), the recording/playback unit 113 reads the video data at a speed of 30 frames per second from the storage unit 114, reads the audio data synchronized with the video data, and then outputs the video and audio to the speaker 105 and the display 106 respectively (STEP S538). The recording/playback unit 113 judges whether broadcasting of the broadcast program ends based on the EIT, etc. stored in the broadcast control unit 112 (STEP S540). When the broadcasting of the broadcast program does not end (STEP S540: N), the processing returns to STEP S538. When the broadcasting of the broadcast program ends (STEP S540: Y), the recording/playback unit 113 ends recording the broadcast program currently being received (STEP S542), and the processing ends.

In the above embodiment, after the end of the call, the user selects either of the "YES" button 301 and the "NO" button 302 relating to whether or not to specify a playback speed. When the "NO" button 302 is selected, the broadcast program is recorded at the default playback speed. However, the user may always specify a remaining playback time period. In this case, the operations in STEPS S518 to S522 and the operations in STEPS S538 to S542 are omitted.

In addition, the operations in STEPS S610 to S614 described below are also omitted in this case.

Hereinafter, the following will describe the operations when the user specifies special playback during the playback of the recorded broadcast program in STEP S520 or S530 shown in FIG. 6, with reference to the flowchart shown in FIG. 7.

The recording/playback unit 113 plays back the recorded broadcast program at the default playback speed or the calculated playback speed (STEP S602). Upon receiving a specification of special playback from the operation unit 107 via the broadcast control unit 112 (STEP S604: Y), the recording/playback unit 113 performs the specified special playback, such as slow playback and reverse playback (STEP S606).

In the same way, upon receiving an instruction for stopping the special playback from the operation unit 107 (STEP S608: Y), the recording/playback unit 113 restarts the chasing playback. Here, the recording/playback unit 113 judges whether a playback speed is specified or not (STEP S610). When the playback speed is not specified (STEP S610: N), the recording/playback unit 113 plays back the recorded broadcast program at a speed of 1.5 times the default playback speed for example (STEP S612), and continues this processing until the playback of the recorded broadcast program catches up with the real-time broadcast (STEP S614). When the playback of the recorded program catches up (STEP S614: Y), the processing proceeds to STEP S626.

When the playback speed is specified (STEP S610: Y), the recording/playback unit 113 receives a specification of a remaining playback time period (STEP S616), and substitutes a known value for the playback speed calculation formula (1) to calculate a playback speed $x_n$ (STEP S618). When the calculated playback speed exceeds a predetermined limit playback speed, for example three times the standard playback speed (STEP S620: Y), the processing returns to STEP S616, and a remaining playback time period is re-specified by the user.

When the calculated playback speed does not exceed (STEP S620: N), the recording/playback unit 113 reads the video and audio data from the storage unit 114 at the playback speed calculated in STEP S618, and then outputs audio and video to the speaker 105 and the display 106 respectively (STEP S622).

The recording/playback unit 113 continues this processing until the playback of the recorded broadcast program catches up with the real-time broadcast (STEP S624). When the playback of the recorded broadcast program catches up (STEP S624: Y), the recording/playback unit 113 ends recording the broadcast program currently being received (STEP S626), outputs audio and video of the broadcast program to the speaker 105 and the display 106 respectively (S628), and the processing ends.

Hereinafter, the following will describe the operations in the case where the mobile phone again receives an incoming call during the playback of the recorded broadcast program in STEP S520, S530, or S538 shown in FIG. 6, with reference to the flowchart shown in FIG. 8.

The recording/playback unit 113 reads the video and audio data from the storage unit 114 at a prescribed playback speed, and outputs the read video and audio data to the speaker 105 and the display 106 respectively (STEP S702).

When the mobile phone receives an incoming call (STEP S704: Y), the communication control unit displays information indicating that the incoming call has been received on the display 106 (STEP S706).

Upon receiving a notification of call start from the communication control unit 103 via the broadcast control unit 112 (STEP S708: Y), the recording/playback unit 113 continues recording the broadcast program, interrupts outputting the video and audio of the recorded program being played back (STEP S710), and waits for a notification of call end (STEP S712). Upon receiving the notification of the call end (STEP S712: Y), the recording/playback unit 113 restarts playing back the recorded video from the interrupted part (STEP S714), and judges whether a playback speed is specified or not (STEP S716).

When the playback speed is not specified (STEP S716: N), the recording/playback unit 113 plays back the recorded broadcast program at a speed of 1.5 times (STEP S718), and continues this processing until the playback of the recorded broadcast program catches up with the real-time broadcast (STEP S720). When the playback of the recorded broadcast program catches up (STEP S720: Y), the processing proceeds to STEP S732. When the playback speed is specified (STEP S716: Y), the recording/playback unit 113 judges whether a remaining playback time period is specified (STEP S722). When the time period is specified (STEP S722: Y), the recording/playback unit 113 substitutes the specified time period and the known value for the playback speed calculation formula (1) to calculate a playback speed (STEP S724). The recording/playback unit 113 judges whether the calculated playback speed exceeds a predetermined limit playback speed (STEP S726). When the calculated playback speed exceeds (STEP S726: Y), the processing returns to STEP S722 and the recording/playback unit 113 again receives a remaining playback time period inputted by the user. When the calculated playback speed does not exceed (STEP S726: N), the recording/playback unit 113 plays back the recorded broadcast program at the calculated playback speed (STEP S728). The recording/playback unit 113 judges whether the playback of the recorded broadcast program catches up with the real-time broadcast (STEP S730). When the recorded broadcast program does not catch up (STEP S730: N), the processing returns to STEP S728. When the playback of the recorded broadcast program catches up (STEP S730: Y), the recording/playback unit 113 ends recording the broadcast program currently being received (STEP S732), and outputs audio and video of the broadcast program currently being received to the speaker 105 and the display 106 respectively (STEP S734), and the processing ends.

When the remaining playback time period is not specified (STEP S722: N), the recording/playback unit 113 reads the video and audio data, and plays back the read video and audio data at the standard playback speed (STEP S736), and continues the playback until the end of the broadcasting of the broadcast program currently being received (STEP S738). When the broadcasting ends (STEP S738: Y), the recording/playback unit 113 ends recording the broadcast program (STEP S740), and the processing ends.

In the above embodiment, an incoming call is given a higher priority than playback of a broadcast program currently being received, as one example. When the incoming call is received, or when a call starts, the recording/playback unit 113 starts recording the broadcast program currently being received. However, the followings may be also given higher priority than playback of broadcast programs to interrupt the playback.

(1) The Case of Receiving Incoming E-mails

When an incoming e-mail is received, a screen displaying a broadcast program being received is switched to a screen displaying information "CURRENTLY RECEIVING E-MAIL". Simultaneously with the screen switching, the recording/playback unit 113 starts recording the broadcast program. Also, instead of this, when a received e-mail is opened, the recording/playback unit 113 may start recording the broadcast program.

(2) The Case of Making Calls

When making a call, the user selects a menu "MAKE A CALL" from a menu "SUB MENU" displayed on the screen. The user selects either of "ENTER A PHONE NUMBER?" and "EXTRACT A PHONE NUMBER FROM PHONE BOOK? " to make the call. In this case, simultaneously with the selection of the menu "MAKE A CALL" by the user, the recording/playback unit 113 starts recording a broadcast program currently being received. This allows the user to watch the broadcast program after the end of the call, even if the user suddenly needs to make the call.

(3) The Case of Sending E-mails

When sending an e-mail, the user selects a menu "SEND AN E-MAIL" from the menu "SUB MENU". A screen displaying a broadcast program is switched to a screen for making e-mails. In this case, simultaneously with the selection of the menu "SEND AN E-MAIL", the recording/playback unit 113 starts recording the broadcast program. This allows the user to watch the broadcast program after the end of the call, even if the user suddenly needs to send the e-mail.

(4) The Case of Accessing Websites

When accessing an Website, in the same manner with e-mail sending, etc., the user selects a menu "CONNECT THE INTERNET" provided for website access from the menu "SUB MENU", to access the Website. Simultaneously with the selection of the menu "CONNECT THE INTER- NET", the recording/playback unit 113 starts recording a broadcast program currently being received. In digital broadcasting, since data is received simultaneously with video and audio, an URL, etc. are displayed on the screen. When the user accesses the URL, a screen displaying the broadcast program is switched to a screen displaying a page of the Website. This allows the user to inevitably watch all the parts of the broadcast program by recording.

(5) The Case of Informing Alarm

When playback of a broadcast program currently being received is interrupted by sounds or vibration to inform an alarm at a set time, the recording/playback unit 113 starts recording the broadcast program.

(6) In addition, recording of a broadcast program currently being received may be set so as to start the recording when other situations having a higher priority than playback of the broadcast program occur. For example, when the user selects a schedule menu or when programs are distributed, the recording/playback unit 113 may start recording the broadcast program.

In the above embodiment, the user inputs a remaining playback time period of a recorded broadcast program. However, the user may input a playback end time. In this case, the recording/playback unit 113 calculates a difference between the playback end time and a current time to acquire the remaining playback time period of the recorded broadcast program $t_R$.

Also, in the above embodiment, the user inputs a remaining playback time period of the broadcast program, and the recording/playback unit 113 calculates a specified playback speed. However, instead of the remaining playback time period of the broadcast program, the user may input a specification at which times the standard playback speed the recorded broadcast program is played back. In this case, the recording/playback unit 113 calculates a remaining playback time period based on the playback speed calculation formula (2).

Furthermore, in the above embodiment, only when a recorded broadcast program is played back at the standard playback speed, the broadcast control unit 112 acquires a broadcasting end time of the recorded broadcast program from the broadcast program shown by the EIT, and instructs the recording/playback unit 113 to end recording the broadcast program currently being received. However, instead of the playback at the standard playback speed, when broadcasting of the broadcast program ends, the broadcast control unit 112 instructs the recording/playback unit 113 to end recording the broadcast program currently being received. With this structure, another broadcast program to be played back following the broadcast program being played back is not recorded. Accordingly, power consumption can be saved.

Also, in the above embodiment, TV broadcast programs are received for the description, as one example. However, digital radio broadcast programs may be received instead.

Also, in the above embodiment, in TV broadcast programs, transport streams of digital signals are received for the description. However, TV broadcast programs of analog signals may be received instead.

Furthermore, the structure of the above embodiment is shown in FIG. 1. However, the present invention may be realized with a program for causing a computer to perform the functions of the compositional elements.

INDUSTRIAL APPLICABILITY

A mobile terminal according to the present invention, as being indispensable to watching broadcast programs, can activate the manufacture and sales in the information and communication fields.

The invention claimed is:

1. A mobile terminal having a broadcast program receiving function in addition to a communication function, comprising:
    a memory;
    a recording unit operable, when playback of a broadcast program being received is disabled by the communication function having priority over the playback, to record the broadcast program in the memory as broadcast data including audio data and video data; and
    a playback unit operable, when the disabled playback changes to be enabled, to play back the broadcast data.

2. The mobile terminal of claim 1, wherein the playback is disabled either on receipt of an incoming call having priority over the playback, or on commencement of a call, and the disabled playback changes to be enabled when the call ends.

3. The mobile terminal of claim 2, wherein the playback unit includes a first playback subunit operable to receive a specification of a playback speed from a user and play back the recorded broadcast data at the specified playback speed.

4. The mobile terminal of claim 3, wherein the first playback subunit includes:
    a standard playback subunit operable to play back the recorded broadcast data at a standard playback speed equal to an original playback speed of the broadcast program; and
    a high-speed playback subunit operable to play back the broadcast data at a playback speed higher than the standard playback speed.

5. The mobile terminal of claim 4, wherein
    the first playback subunit further includes a special playback subunit operable to perform slow playback and reverse playback during the playback of the recorded broadcast data.

6. The mobile terminal of claim 5, wherein the high-speed playback subunit includes a calculation subunit operable to receive a remaining playback time period from the user, and calculate, based on a predetermined formula, a playback speed indicating a number of frames to be played back per second, and the high-speed playback subunit reads the broadcast data from the memory, and plays back the read broadcast data at the calculated playback speed.

7. The mobile terminal of claim 6, wherein
    when another incoming call is received during the playback or when another call starts,
    the playback unit interrupts the playback,
    the calculation subunit recalculates a playback speed based on the predetermined formula, and
    an output subunit outputs the recorded broadcast data from an interrupted part, to a monitor at the re-calculated playback speed.

8. The mobile terminal of claim 7, wherein the predetermined formula used by the calculation subunit is [formula 1]

$$x_n = x_0 + \frac{1}{t_R} \sum_{i=1}^{n} (x_0(t_i + P_{i-1}) - x_{i-1} P_{i-1}),$$

where
- $x_n$ is a reading speed at which the output subunit reads the video data from the memory after an end of a number of n calls [frame/sec],
- $x_0$ is a number of frames to be played back per second at the standard playback speed, i.e. a reading speed at which the video data to be read from the memory [30 fps],
- $t_R$ is a specified remaining high-speed playback time period (a chasing playback time period) [sec],
- $t_i$ is a duration of an i-th call [sec], and
- $P_i$ is a high-speed playback time period after an end of the i-th call [sec].

9. The mobile terminal of claim 6, wherein the predetermined formula used by the calculation subunit is [formula 1]

$$x_n = x_0 + \frac{1}{t_R}\sum_{i=1}^{n}(x_0(t_i + P_{i-1}) - x_{i-1}P_{i-1}),$$

where
- $x_n$ is a reading speed at which the output subunit reads the video data from the memory after an end of a number of n calls [frame/sec],
- $x_0$ is a number of frames to be played back per second at the standard playback speed, i.e. a reading speed at which the video data to be read from the memory [30 fps],
- $t_R$ is a specified remaining high-speed playback time period (a chasing playback time period) [sec],
- $t_i$ is a duration of an i-th call [sec], and
- $P_i$ is a high-speed playback time period after an end of the i-th call [sec].

10. The mobile terminal of claim 4, wherein the high-speed playback subunit includes a calculation subunit operable to receive a remaining playback time period from the user, and calculate, based on a predetermined formula, a playback speed indicating a number of frames to be played back per second, and the high-speed playback subunit reads the broadcast data from the memory, and plays back the read broadcast data at the calculated playback speed.

11. The mobile terminal of claim 10, wherein
when another incoming call is received during the playback or when another call starts,
the playback unit interrupts the playback,
the calculation subunit recalculates a playback speed based on the predetermined formula, and
an output subunit outputs the recorded broadcast data from an interrupted part, to a monitor at the re-calculated playback speed.

12. The mobile terminal of claim 11, wherein the predetermined formula used by the calculation subunit is [formula 1]

$$x_n = x_0 + \frac{1}{t_R}\sum_{i=1}^{n}(x_0(t_i + P_{i-1}) - x_{i-1}P_{i-1}),$$

where
- $x_n$ is a reading speed at which the output subunit reads the video data from the memory after an end of a number of n calls [frame/sec],
- $x_0$ is a number of frames to be played back per second at the standard playback speed, i.e. a reading speed at which the video data to be read from the memory [30 ],
- $t_R$ is a specified remaining high-speed playback time period (a chasing playback time period) [sec],
- $t_i$ is a duration of an i-th call [sec], and
- $P_i$ is a high-speed playback time period after an end of the i-th call [sec].

13. The mobile terminal of claim 10, wherein the predetermined formula used by the calculation subunit is [formula 1]

$$x_n = x_0 + \frac{1}{t_R}\sum_{i=1}^{n}(x_0(t_i + P_{i-1}) - x_{i-1}P_{i-1}),$$

where
- $x_n$ is a reading speed at which the output subunit reads the video data from the memory after an end of a number of n calls [frame/sec],
- $x_0$ is a number of frames to be played back per second at the standard playback speed, i.e. a reading speed at which the video data to be read from the memory [30 ],
- $t_R$ is a specified remaining high-speed playback time period (a chasing playback time period) [sec],
- $t_i$ is a duration of an i-th call [sec], and
- $P_i$ is a high-speed playback time period after an end of the i-th call [sec].

14. The mobile terminal of claim 4, wherein
when broadcasting of the broadcast program being played back ends, the recording unit stops recording the broadcast program.

15. The mobile terminal of claim 4, wherein the playback unit further includes a second playback subunit operable, when the specification of the playback speed is not received, to play back the recorded broadcast data at a default playback speed suitable for hearing audio.

16. The mobile terminal of claim 15, wherein when the playback of the recorded broadcast data by the second playback subunit or the high-speed playback subunit catches up with the real-time broadcast, or when broadcasting of the broadcast program being played back ends during the playback of the recorded broadcast data by the standard playback subunit, the recording unit stops recording the broadcast program.

17. The mobile terminal of claim 3, wherein the playback unit further includes a second playback subunit operable, when the specification of the playback speed is not received, to play back the recorded broadcast data at a default playback speed suitable for hearing audio.

18. The mobile terminal of claim 17, wherein the second playback subunit plays back the recorded broadcast data at a playback speed within a range from 1.0 time to 2.0 times the standard playback speed.

19. A method for recording and playing back a broadcast program in a mobile terminal having a broadcast program receiving function in addition to a communication function, the method comprising the steps of:
recording, when playback of a broadcast program being received is disabled by the communication function having priority over the playback, the broadcast program in the memory as broadcast data including audio data and video data; and
playing back, when the disabled playback changes to be enabled, the broadcast data.

20. A program embodied in a computer usable medium, comprising: said program is configured to cause a processor of a mobile terminal to execute the steps of:
recording, when playback of a broadcast program being received is disabled by a communication function having priority over the playback, the broadcast program in memory as broadcast data including audio data and video data; and
playing back, when the disabled playback changes to be enabled, the broadcast data.

21. A mobile terminal comprising:
a broadcast wave receiving unit operable to receive a broadcast wave;
a playback unit operable to play back broadcast data including audio data and video data, based on the broadcast wave;
a recording unit operable to record the broadcast data when the playback of the broadcast data by the playback unit is interrupted by execution of a communication function that has priority over the playback;
a control unit operable, when the playback is restarted, to control the playback unit to display, on a display, video data of a predetermined part of the recorded broadcast data and information that urges input of an instruction to play back the recorded broadcast data, wherein
the playback unit is able to play back the recorded broadcast data at a standard playback speed and a playback speed higher than the standard playback speed.

* * * * *

UNITED STATES PATENT AND TRADEMARK OFFICE
CERTIFICATE OF CORRECTION

PATENT NO.         : 7,493,079 B2                                    Page 1 of 1
APPLICATION NO. : 10/598677
DATED              : February 17, 2009
INVENTOR(S)        : Michiaki Koizumi et al.

It is certified that error appears in the above-identified patent and that said Letters Patent is hereby corrected as shown below:

In the header, "Koizume et al." should be --Koizumi et al.--

At (75), "Koizume" should be --Koizumi--

Signed and Sealed this

Tenth Day of November, 2009

David J. Kappos
*Director of the United States Patent and Trademark Office*